July 24, 1962

K. B. HAWTHORNE ETAL 3,045,835

DISPLAY STAND

Filed Feb. 1, 1960

INVENTORS
**KENNETH B. HAWTHORNE
FREDERICK A. MAGUIRE**

BY *Benton A. Bull*

ATTORNEY

July 24, 1962 K. B. HAWTHORNE ETAL 3,045,835
DISPLAY STAND
Filed Feb. 1, 1960 4 Sheets-Sheet 2

INVENTORS
KENNETH B. HAWTHORNE
FREDERICK A. MAGUIRE

BY *Benton A. Bull*

ATTORNEY

INVENTORS
KENNETH B. HAWTHORNE
FREDERICK A. MAGUIRE

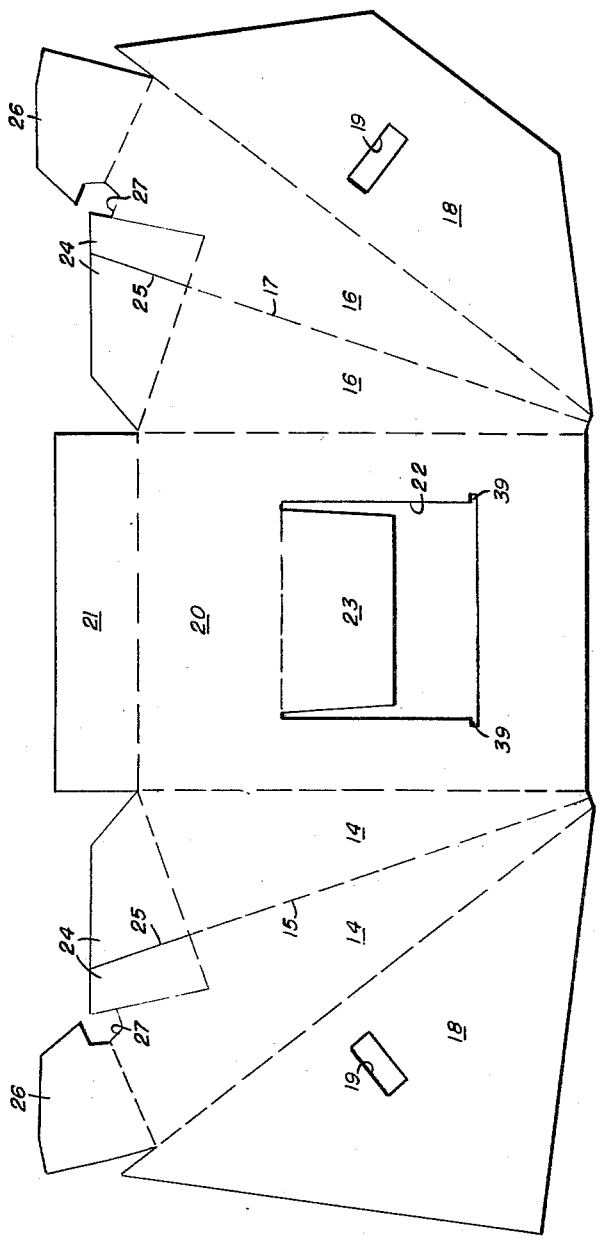

United States Patent Office 3,045,835
Patented July 24, 1962

3,045,835
DISPLAY STAND
Kenneth B. Hawthorne, Princeton, and Frederick A. Maguire, Pompton Plains, N.J., assignors to Johnson & Johnson, a corporation of New Jersey
Filed Feb. 1, 1960, Ser. No. 5,981
6 Claims. (Cl. 211—149)

This invention relates to a display stand. More specifically, this invention relates to a display stand of collapsible nature which is adapted to be made from sheet material and wire.

The display stands of the prior art have often been made of sheet material. Such devices have the disadvantage of offering a heavy cumbersome appearance with heavy solid looking bases, but they have had the advantage of affording surfaces for printing and decoration. Alternatively, the display stands of the prior art have been structures made entirely of wire. These structures give a pleasing airy appearance, but do not readily afford areas for decorative printing, advertising or the like, nor do they give the appearance of strength.

The present invention combines the desirable attributes of two such types of prior structures in the art by providing a structure made partly of sheet material and partly of wire. It is thus given the appearance of considerable strength and provides surface area for printing, and yet at the same time it presents a light airy effect.

It is therefore, an object of this invention to provide a display stand made of both sheet material and wire.

It is a further object of this invention to provide a display stand designed in such a way that it may be easily collapsed into a flat disposition for portability and shipment.

It is a further object of this invention to provide a display stand made partially of sheet material cut from blanks which may be assembled into a three-dimensional structure in such a way that all of the exposed areas of the structure are on one side only of each blank whereby printing on one side only of each blank decorates all visible surfaces of the assembled structure.

It is a further object of this invention to provide a display stand which may be assembled from a collapsed unit, such assembly being unusual and complicated enough to be intriguing and yet simple enough to be easily accomplished.

This invention embodies other novel features, details of which and arrangement of parts of which are herein set forth in the specification and claims, and illustrated in the accompanying drawings, wherein:

FIG. 1 is a perspective view of a display stand embodying the invention;

FIG. 2 is a side elevational view thereof;

FIG. 3 is an enlarged fragmentary view in perspective showing an upper corner of a display stand embodying the invention;

FIG. 9 is a plan view of a blank from which a part of a display stand embodying the invention may be made.

Figure 4:
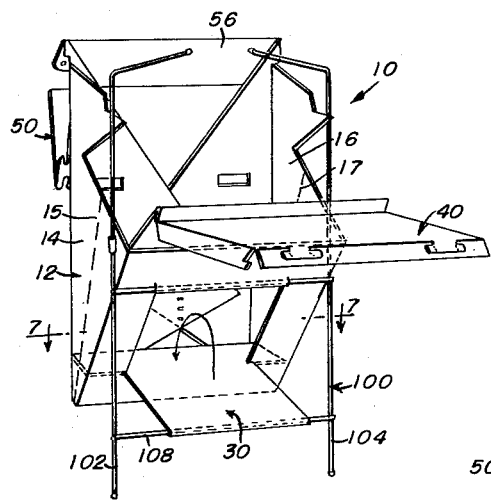
FIGS. 4, 5 and 6 are perspective views showing progressive steps in the assembly of a display stand embodying the invention.

Briefly, the invention is a display stand comprising a bin-like body member having side walls and an upwardly and forwardly sloping front wall and having a false floor adjacent its upper end. The rear portion of the bin extends upward and supports an upper shelf, and a portion of the front wall of the body member has an opening the bottom edge of which supports a lower shelf. The stand also includes a wire prop frame member the lower ends of which are adapted to rest on the floor forward of the lower end of the body member. The frame member supports the forward end of the lower shelf and is attached to and props up the body member and the upper portion of the frame member extends up to engage the upper shelf.

Referring more specifically to the drawings, in FIG. 1, the display stand is generally designated 10. It comprises a bin-like body member 12 with two substantially triangular side walls 14 and 16, a partial rear wall 18 and a front wall 20. The front wall 20, as shown, slopes forwardly and upwardly from the floor and is formed with a large opening 22 in which is disposed a lower shelf unit 30. The bin-like body member 12 has a false floor unit 40 adjacent its upper end. The rear portion of the bin-like body member extends upward above the false floor unit 40 and supports an upper shelf unit 50. A wire prop frame member 100 is provided and supports the front end of the lower shelf and is secured to the front wall 20 of the bin-like member.

Figure 8:
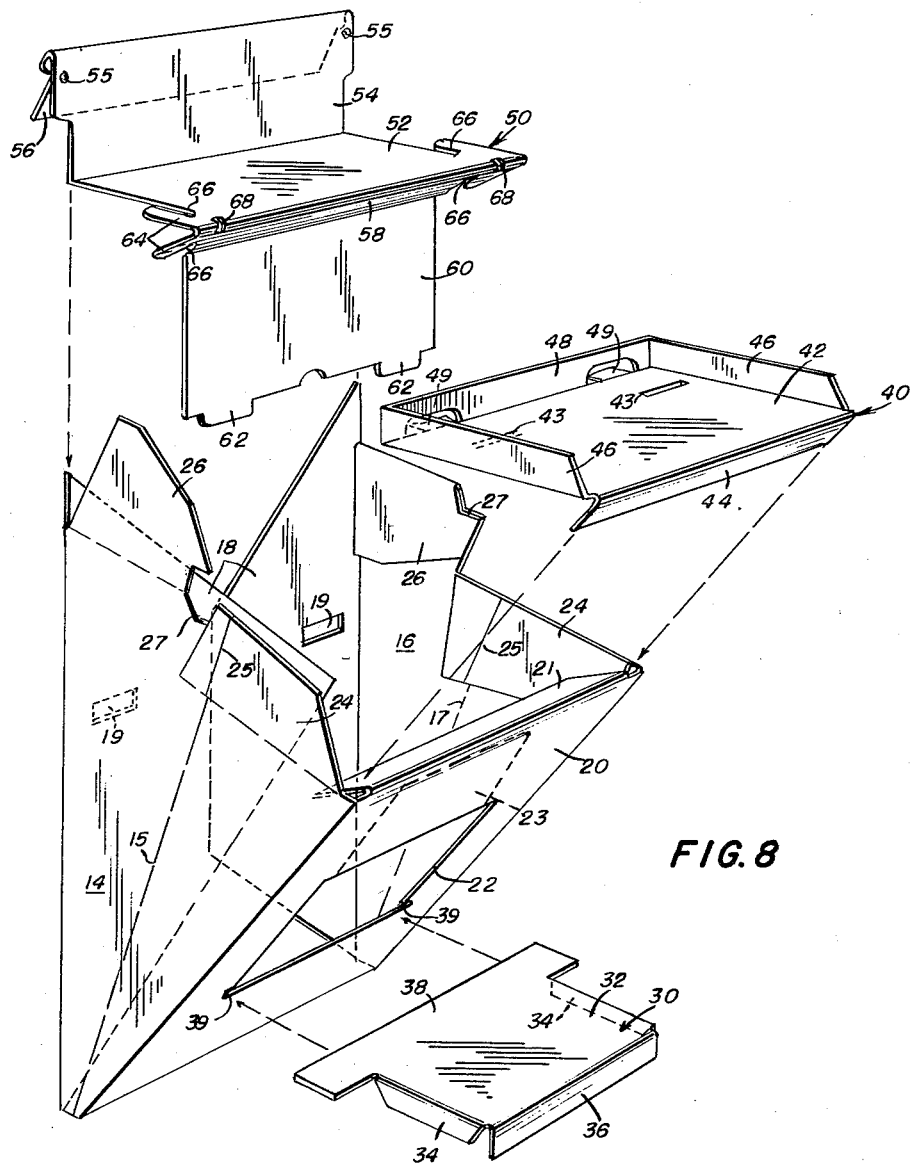
FIG. 8 is an exploded perspective view of portions of a display stand embodying the invention.

A complete idea of construction of a preferred embodiment of the invention is shown in FIG. 8. As shown, in this view the bin-like body member preferably comprises a single blank. The body member includes the two substantially triangular side wall members 14 and 16 the forward ends of which slant upwardly and forwardly and are secured to the side edges of a front wall member 20. The partial rear wall 18 comprises two panels secured respectively to the rear vertical edges of the triangular side walls. These rear wall panels are secured together where they overlap by glue or staples to give continuity to the form. The rear wall panels are formed with openings 19. So that the triangular side walls may fold accordion fashion they are heavily scored on lines 15 and 17 extending upward from their lower ends and dividing each side into portions. By this means the side walls may be respectively folded by drawing the area adjacent the score lines inwardly.

FIG. 9 is an elevational view of a blank from which the bin-like body member 12 may be formed. It may be noted that all of the surface areas of the bin-like body member which are visible after assembly of stand are on one side of the blank before assembly. This arrangement permits printing with decoration or advertising on all exposed surfaces of the bin-like body member by printing on one side of the blank before assembly. In FIG. 9, the blank is shown with its panels each designated with a reference number according to the portion of the assembled unit it comprises. It may be noted from FIG. 9 that so that printing appears on all of its exposed surfaces when assembled, and for other reasons, a number of foldable flaps are included in the blank. For instance, the front wall 20 is equipped along its upper edge with an integral fold-down lip 21 to which the false floor is later secured. Additionally, the upper edge of the opening in the front wall has a large tab 23 adapted to be folded inwardly and upwardly against the inner surface of the front wall 20 for reasons which will appear. The forward upper edges of the side walls also have integral extensions which comprise fold-down tabs 24 to cover the unprinted inside surfaces of the side walls. To permit folding of the side walls, tabs may split as at 25. Similarly, the upper rear edges of the side walls are also formed with integral inwardly foldable tabs 26. The forward edge of the walls and the tabs are cut off to comprise shoulders 27.

As shown in FIG. 8, the lower unit 30 comprises a generally T-shaped support structure having a forward extending support panel 32 with the side strips 34 and the forward tab 36 all being integral with the support panel and adapted to be folded under against the undersurface of the support panel 32. The head panel 38 of the T-shaped unit 30 is disposed horizontally within the bin-shaped body member 12 and substantially conforms with the cross section thereof for a neat fit which stabilizes the lower shelf unit 30. As shown, the side edges of the opening 22 in a front wall of the bin-shaped body member may be slightly closer together than the width of the lower shelf and have lateral notches 39 at the lower ends thereof, whereby when the lower shelf is pressed downward against the lower edge of the opening 20, the shelf snaps into the notches so that it is held down properly.

The false floor unit 40 of the bin-like body member comprises a tray-like member as shown in FIG. 8. The tray includes a horizontal support panel 42 which may be reinforced by having an extra thickness of sheet material secured against the underside thereof. Support panel 42 is formed with elongate openings 43. The forward edge of the false floor unit has an integral strip 44 therealong which may be turned down and secured to the turned down lip 21 along the upper edge of the front wall 20 of the bin-like body member. By this means the forward portion of the false floor unit 40 is supported. The false floor unit 40 also includes integral side flaps 46 which are turned up at right angles and the integral upturned rear flap 48 at the rear of the support panel. In assembly these flaps engage against the inside surfaces of the side and rear walls respectively of the bin-like member 12. A portion of the rear flap 48 of the tray or false floor unit 40 as shown in FIG. 8 may have rearwardly extending tongues 49 which fit into the openings 19 in the partial rear wall 18 of the bin-shaped body member to support the rear portion of the false floor unit 40. These tongues may have lateral ears which are bendable to lock the tongues in their proper relation on the rear side of the partial rear wall 18. It should be noted that all the surfaces of the false floor unit 40 or tray which are exposed when the display stand is assembled are on one side of the blank, whereby if it is desired to imprint designs thereon, printing on one side of the blank only will be involved.

The upper shelf unit 50 as shown in FIG. 8 is similarly formed from a blank so that all exposed surfaces are on one side of the blank. The blank includes the upper shelf support panel 52 which has an integral upwardly turned riser panel 54 which is widened adjacent its upper end and formed with a pair of horizontally aligned apertures 55 adjacent the extremes thereof. The riser panel 54, in turn, has along its upper edge an integral securing panel 56 which is folded down and doubled back against the riser panel. This securing panel 56 is secured to the upper end of the partial rear wall 18 of the bin-like body member by staples or the like in the assembly of the stand. The riser panel 54 is thus substantially planar with the partial rear wall 18 of the body member 12.

The front edge of the support panel 52 of the upper shelf unit has integrally secured thereto a spacing panel 58 which is adapted to be doubled under the support panel and secured thereto by staples or adhesive. The rear edge of the spacing panel has, in turn, attached thereto a strut panel 60 adapted to extend down to the false floor unit 40 and to assist in supporting the upper shelf unit. The distal edge of the strut panel carries a pair of spaced tabs 62 which fit into the elongated openings 43 in the support panel 42 of the false floor. To assist in the support of upper shelf unit 50, the support panel and the spacing panel include laterally extending wings 64 which are adapted to rest on the shoulders 27 of the bin-like body member 12. As can be seen in FIG. 8, wings 64 are formed in both the support panel 52 and the spacing panel 58 and are mirror reflections of each other so that in assembly there is formed a double thickness wing structure. The wings 64 each have rearward directed fingers 66 adapted to frictionally engage a portion of the upper side walls 14 and 16 of the bin-shaped body member 12 to laterally stabilize the upper shelf unit 40. Adjacent their leading edges support panel 52 and spacing panel 58 have notches 68 extending rearwardly for purposes which will be explained.

The component parts of the display stand shown in FIG. 8 may be made entirely of inexpensive sheet material such as heavy corrugated board. The remainder of the display stand comprises the wire prop frame member 100 (see FIG. 1). The frame member comprises a pair of upright elements 102—104 each of which may include two or more pieces which may be telescoped together as at 105. The upright elements have their lower ends terminating in rubber feet 106 and are adapted to frictionally engage the floor and extend upwardly at a slight rearward incline. Adjacent the upper ends the upright elements are each angled abruptly rearward and their ends impale the riser panel 54 of the upper shelf unit through the apertures 55. The upper ends of the upright elements may terminate in rubber caps 107 (see FIG. 2) to help retain them on the rear side of the riser panel 54. The wire prop frame member may also include cross elements 108—110 each secured at both ends respectively to the two upright elements 102—104. The lower cross element 108 is attached to the forward end of the lower shelf unit 30 by extending through the tunnel formed between the support panel 32 and the forward tab 36. The upper cross element 110 may be similarly secured to the partial front wall 20 of the bin-like body member by extending through the tunnel formed along the upper edge of the large rectangular opening 22 between tab 23 and the front wall. Additionally stabilizing the position of the wire prop frame member 100 are the notches 68 in the forward edge of the upper shelf unit 50. These notches receive respectively and frictionally engage the two upright elements 102—104.

One of the distinct advantages of the display stand embodying the invention is that it may be collapsed into a flat disposition for portability and shipping. The collapsibility may be inferred from FIG. 4. The rear portion of the lower shelf unit 30 may be pivoted upwardly about the lower cross element 108 and the side walls 14 and 16 of the bin-shaped body member may be drawn inwardly along their score lines 15 and 17. Additionally, the false floor unit may be pivoted down flat against the front wall 20 of the bin-like body member. The unit thus disposed, is substantially flat and may be shipped in a flat container.

Figure 5:
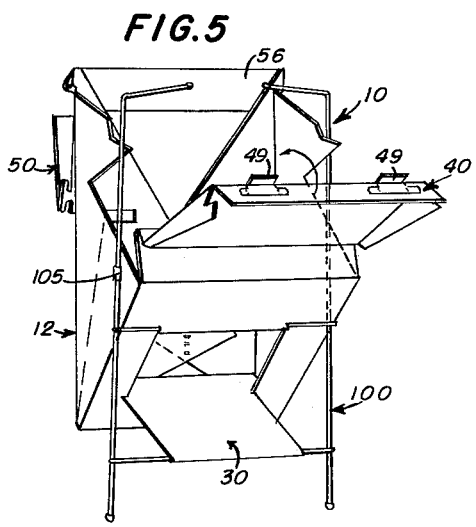
Figure 6:
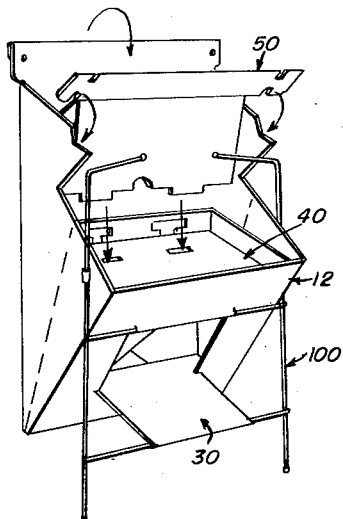
Figure 7:
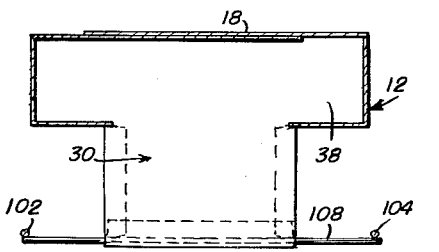
FIG. 7 is a sectional view taken on the line 7—7 of FIG. 4.

Progressive steps in the assembly are disclosed in FIGS. 4 through 6. In FIG. 4 it is illustrated that the rear portion of the lower unit 30 may be pivoted down to rest on the lower edge of the opening 22, and the two side walls of the bin-shaped body member may be drawn outwardly along their lines of score to assume planar disposition. Subsequently as shown in FIG. 5 the false floor unit 40 may be pivoted up and over the front edge of the front wall 20 so that it rests in the bin-like body member 12 with its rearward tongues 49 extending through the rectangular openings 19. The upper shelf unit 50 is then pivoted over the rear of the bin-shaped body member as shown in FIG. 6 so that the wings 64 rest on the shoulders 27 and the tabs 62 in the strut panel fit into the elongated openings 43 in the support panel of the tray-like false floor unit 40. The rearward fingers 66 engage the portion of the side walls of the bin-like body member adjacent the shoulders. To complete the assembly as shown in FIG. 1, the upright elements 102—104 of the wire prop frame member 100 are turned in their telescope sockets at 105 so that the upper portions are directed rearwardly and their ends impale the two apertures 55 in the riser panel 54 of the upper shelf unit 40. The upright elements 102—104 below the rearward angles are made to rest in the notches 68 in the leading edge of the upper shelf unit.

The term "wire," as used herein does not limit the stock to any transverse dimension but, rather, encompasses stout elongate material such as rods and tubes.

From the drawings it may be seen that once the unit is assembled it provides three separate terraces for supporting articles. Different articles may be placed respectively on the three terraces, and the upper shelf and the false floor may be subdivided to carry a stock of each of a number of different articles. In this connection it is to be understood that the false floor unit 40 is particularly well adapted for partitioning as by egg crate partitions well known in the art. It is also well adapted for supporting and holding supplemental inclined supporting floors whereby articles placed thereon may be tilted at an angle so that their faces uppermost are appropriately disposed for easy viewing. In addition, as is well known in the art, the upper portion of the partial rear wall of the bin-shaped body member may have secured thereto a pair of upwardly extending arms to which may be secured an advertising placard or the like disposed above the top edge of the riser panel 54. However, these adaptations are well taught in the art. They are merely suggested here to imply the versatility of structures embodying the invention.

It has been shown that a unit embodying the invention has the advantages of being constructed from inexpensive material and still provides a structure of considerable strength and a pleasing light, airy appearance. The preferred manner of assembling and constructing a unit embodying the invention as discussed above carries the additional advantage that it comprises blanks which in assembly have all their exposed surfaces on one side of the blanks, whereby printing on the overall structure is effected by merely printing on one side of each of the various blanks. This feature obviously effects an additional economy. Another extremely important advantage of a display stand and embodying the invention as disclosed is that it is adapted to be easily collapsed into a substantially flat package facilitating its portability and shipment. In addition to all of these advantages, the invention as embodied in the present disclosure is complicated and unusual enough so that its assembly, though easily accomplished, affords an intriguing challenge, thus imparting to the article a considerable sale appeal.

While this invention has been shown in but one form, it is obvious to those skilled in the art that it is not so limited but is susceptible of various changes and modifications without departing from the spirit and scope of the claimed invention.

We claim:

1. A display stand adapted to stand upright on a substantially horizontal supporting surface comprising a bin-like body member defined by a pair of substantially similar aligned spaced side walls, the lower portion of the front edges of said side walls sloping upward and forwardly and the rear edges of said side walls extending substantially vertical, a front wall attached at its opposite edges to the forward edges of the opposite side walls respectively; and a rear wall attached at its opposite edges to the rear edges of the opposite side walls respectively, said front wall having an opening therein; a lower shelf unit having its rear portion resting on the lower edge of said opening; a prop frame member including a pair of spaced elongate upright elements and a pair of vertically spaced cross elements each having its opposite ends attached to the upright elements respectively; the uppermost of said cross elements being attached to said bin-like member at a point above the lower end of said bin-like body member, the lowermost of said cross elements being attached to and supporting the forward portion of said lower shelf unit, said upright elements being adapted to engage the supporting surface forward of the lower ends of the side walls, whereby said upright elements and the lower end of said bin-like body member are adapted to support said display stand.

2. A display stand as described in claim 1 wherein at its upper end said bin-like body member is provided with a horizontally disposed false floor.

3. A display stand adapted to stand upright on a substantially horizontal supporting surface comprising a bin-like body member defined by a pair of substantially similar, aligned spaced side walls of sheet material, the lower portion of the front edges of said side walls sloping upward and forwardly and the rear edges of said walls extending substantially vertical, the upper ends of said side walls including portions which terminate in horizontally aligned substantially horizontal shoulders, means maintaining said side walls in aligned spaced relation, said means including at least a partial front wall attached at its opposite edges to the opposite side walls respectively; an upper shelf unit resting on said horizontal shoulders, said upper shelf unit having in the forward edge thereof a pair of spaced notches, a prop frame member including a pair of spaced elongate upright elements and at least one cross element having its opposite ends attached to the upright elements respectively, said cross element being attached to said bin-like body member at a point above the lower end of said bin-like body member, said upright elements adjacent their upper ends being received respectively into said notches, the lower ends of said upright elements being adapted to engage the supporting surface forward of the lower ends of the side walls, whereby said upright elements and the lower end of said bin-like body member are adapted to support said display stand.

4. A display stand as described in claim 3 wherein said upper shelf unit includes a vertically disposed riser panel disposed at the upper end of the bin-like body member and disposed substantially coplanar with the rear edges of said side walls, and the upper end of said upright elements impales said riser panel.

5. A display stand as described in claim 3, wherein said bin-like body member has a horizontally disposed false floor secured therein and spaced above the lower end of said bin-like body member, and said upper shelf unit includes and is additionally supported by a strut panel the lower end of which engages said false floor.

6. A display stand as described in claim 3 wherein said upper shelf unit includes a pair of laterally extending wings, one disposed on either side of said upper shelf unit, said wings frictionally engaging the outside surfaces of said side walls of said bin-like body member respectively, whereby said shelf unit is stabilized against lateral movement.

References Cited in the file of this patent

UNITED STATES PATENTS

| | | |
|---|---|---|
| 1,258,120 | Kaplan | Mar. 5, 1918 |
| 1,645,533 | Jarvis | Oct. 18, 1927 |
| 1,705,444 | Fischmann | Mar. 12, 1929 |
| 1,835,714 | McCausland | Dec. 8, 1931 |
| 2,298,427 | Slanhoff | Oct. 13, 1942 |
| 2,341,899 | Blechman | Feb. 15, 1944 |
| 2,562,497 | Klein | July 31, 1951 |